United States Patent Office 3,313,684
Patented Apr. 11, 1967

3,313,684
3,5 - DIMETHYL - 4 - METHYLMERCAPTOPHENYL N-METHYL CARBAMATE AND METHODS FOR COMBATING INSECTS
Ernst Schegk, Wuppertal-Elberfeld, Gerhard Schrader, Wuppertal-Cronenberg, and Karl-Friedrich Wedemeyer, Cologne-Stammheim, Germany, assignors to Farbenfabriken Bayer Aktiengesellschaft, Leverkusen, Germany, a corporation of Germany
No Drawing. Original application Nov. 29, 1960, Ser. No. 72,306. Divided and this application Jan. 2, 1964, Ser. No. 335,381
Claims priority, application Germany, Dec. 5, 1959, F 30,015
12 Claims. (Cl. 167—30)

The present invention is a division of copending application Ser. No. 72,306, filed Nov. 29, 1960.

The present invention relates to and has as its objects new and useful insecticidal agents, the processes for their production and the use thereof. The new compounds of this invention are carbamates of the following general formula:

$$R_2-X-Y-Aryl-O-\underset{\underset{O(S)}{\|}}{C}-N\diagdown\begin{array}{c}R\\R_1\end{array}$$
(I)

wherein R and $R_1$ stand for hydrogen or alkyl radicals, $R_2$ stands for an optional alkyl radical, Y stands for $CH_2$ or a direct bond between $R_2$ and Y and X may be S, SO or $SO_2$.

The new compounds in accordance with the present invention can be produced in a manner known in principle. For example, suitable phenols may be converted by means of phosgene or thiophosgene into the corresponding chloroformic acid esters or chlorothioformic acid esters and the latter reacted with ammonia, or suitable primary or secondary amines.

Furthermore, suitable phenols may sometimes be reacted advantageously with suitable dialkyl- or dialkyl(-thio)-carbamic acid chlorides. If monoalkylamides are to be produced, suitable phenols may also be reacted with suitable isocyanates or mustard oils. The following reaction schemes may illustrate these methods, described before:

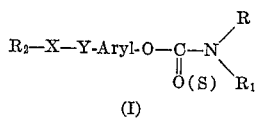

(in this case $R_1=H$).

Phenols suitable as starting materials may become apparent from the following table, without however, restricting this invention in any way thereto:

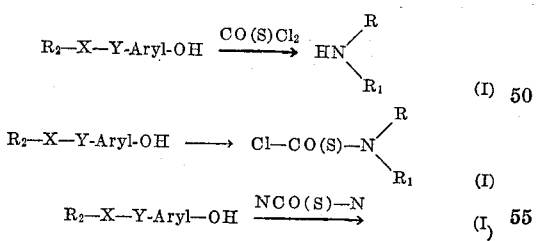

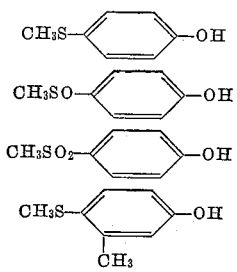

The new carbamates formed according to the process of the invention are distinguished by a good insecticidal and acaricidal action while having a low toxic action on warm blooded animals. In some cases the compounds have also a systemic action.

The new compounds of the present invention very effectively kill insects like flies, mites, aphids, etc. They distinguish themselves especially by a good contact-insecticidal activity and at the same time by an activity on eating insects such as caterpillars. The compounds may be used in the same manner as other known insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds the ester of the following formula:

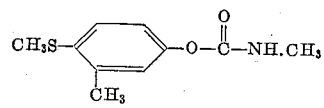

has been tested against mosquito larvae, caterpillars and ticks. Aqueous solutions of the aforementioned compound have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The tests have been carried out as follows:

(a) Against mosquito larvae of the type *Aedes aegypti*: about 20 larvae were brought into diluted aqueous emulsions prepared as described above. Counting of the dead pests occurred after 24 hours. The following results have been obtained: Mosquito larvae were killed completely with solutions of 0.0001%.

(b) Against caterpillars: white cabbage has been sprayed drip wet with aqueous emulsions as prepared above in the concentration as indicated below. Caterpillars (of the type diamond back moth, 10 each) have been placed on the sprayed leaves of the white cabbage. The living status has been determined after 24 hours and 48 hours. The results are to be seen from the following: Caterpillars were killed completed with solutions of 0.02%.

(c) Against ticks of the type Boophilus microplus. 10 female ticks each are placed into mull bags which are brought into a solution prepared as described above while moving them continuously. After 1 minute the mull bags are taken off the active solutions and put into glass dishes in which filter paper is placed. The ticks are taken off the mull bags and placed upon dry filter paper. Evaluation occurred after 24, 48, 72 eventually 96 or 120 hours. The following results are obtained: Ticks were killed completely wtih solutions of 0.1%.

The following examples are given for the purpose of illustrating the invention.

*Example 1*

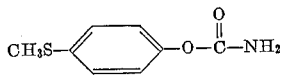

202.6 g. (1 mol) of p-methylmercapto-chloroformic acid phenyl ester (B.P. 59° C./0.01 mm. Hg) are dissolved in 700 ml. of toluene. Into this solution anhydrous ammonia is introduced while stirring at 0 to +10° C. After completion of the reaction, the resulting crystalline product is filtered off with suction. It is washed with plenty of water. On the other hand, the toluene solution is evaporated under vacuum. In this way another crystalline product is obtained. The two crystalline products are combined and re-crystallized from anhydrous alcohol. 146 g. of p-methylmercapto-phenyl-carbamate of M.P. 141° C. are thus obtained. Yield: 80% of the theoretical. On rats per os the ester has a toxicity of 1000 mg./kg. Aphids were killed completely with solutions of 0.1%.

By the same way there may be obtained the following compounds:

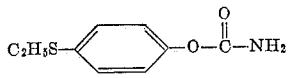

*Example 2*

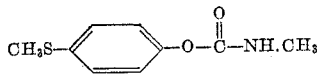

102 g. (0.5 mol) of p-methylmercapto-phenyl-chloroformic acid ester are dissolved in 600 ml. of benzene. At 0° C. 31 g. of anhydrous methylamine are added while stirring. Stirring is continued at room temperature for 4 hours. Subsequently the product is worked up as described in Example 1. In this way, 69 g. of p - methylmercapto - phenyl - methyl - carbamate of M.P. 78–79° C. are obtained. Yield: 70% of the theoretical.

By the same way there may be obtained the following compound:

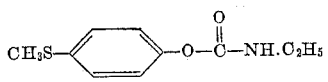

*Example 3*

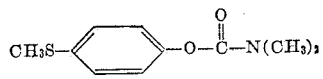

9.2 g. of finely powdered sodium are dispersed in 100 ml. of benzene. To this suspension are added 59 g. of p-methylmercapto-phenol dissolved in 100 ml. of benzene. The suspension is stirred at 30–40° C. for 1–2 hours. The sodium salt of p-methylmercapto-phenol has then been formed. To this suspension is added with further vigorous stirring at 40° C. a solution of 108 g. of dimethylcarbamid acid chloride in 100 ml. of benzene. When the reaction has subsided, the reaction product is placed into 400 ml. of ice-water. The benzene solution is separated, de-acidified with a 3% sodium bicarbonate solution and then dried. In this way, 67 g. of p-methyl-mercapto-phenyl-dimethyl-carbamate of B.P. 93–94° C./0.01 mm. Hg are obtained. Yield: 79% of the theoretical. The $LD_{50}$ toxicity on rats per os is 1000 mg./kg. Aphids are killed completely with solutions of 0.1% . Systemic action with 0.1% solutions is 100%.

By the same way there may be obtained the following compounds:

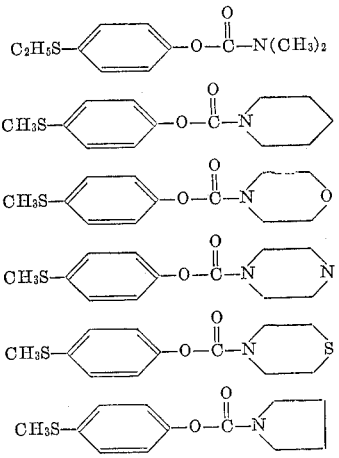

*Example 4*

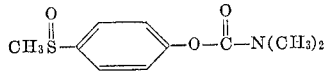

79. g. (0.5 mol) of p-methylsulphinylphenol (M.P. 107° C.) are dissolved in 350 ml. of methyl ethyl ketone. A sodium methylate solution containing 0.5 mol of dissolved sodium is added thereto. Subsequently, 60 g. of dimethyl-thiocarbamic acid chloride are added at 40° C. with vigorous stirring. After completion of the reaction, the product is after-stirred at room temperature for 2 hours. The reaction product is then placed into 300 ml. of ice-water and worked up as described in Example 1. In this way, 68 g. of p-methylsulphinyl-phenyl-dimethyl-carbamate of M.P. 107° C. are obtained. Yield: 60% of the theoretical. Aphids are killed completely with solutions of 0.1%. Systemic action with 0.1% solutions is 100%. The $LD_{50}$ toxicity on rats per os is 500 mg./kg.

*Example 5*

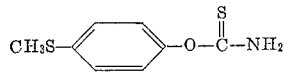

22 g. (0.1 mol) of p-methylmercapto-phenyl-chlorothioformic acid ester (B.P. 72° C./0.01 mm. Hg; M.P. 40° C.) are dissolved in 100 ml. of acetone. This solution is poured with good stirring at −10° C. into a mixture of 20 ml. of 25% aqueous ammonia and 50 ml. of acetone. After completion of the reaction the reaction product is cooled to −10° C. and water is added carefully as long as crystallisation still occurs. The crystalline precipitate is filtered off with suction and recrystallized from benzene. In this way, 9.8 g. of p-methylmercapto-phenyl-thiocarbamate of M.P. 174° C. are obtained. Yield: 50% of the theoretical. $LD_{50}$ toxicity on rats per os is 1000 per mg./kg.

Example 6

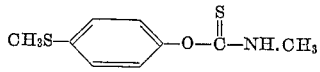

44 g. (0.2 mol) of p-methylmercapto-phenyl-chlorothioformic acid ester are dissolved in 50 ml. of acetone. This solution is added with good stirring at −5 to 0° C. to 50 g. of a 26% aqueous methylamine solution in 50 ml. of acetone. When the reaction has subsided, the reaction product is placed into 200 ml. of ice-water and cooled to −15° C. The reaction product precipitating in a viscid form is separated and dried on clay. Subsequently the product dried on clay is re-crystallized from benzene. In this way, 16.8 g. of p-methylmercapto-phenyl-methyl-thiocarbamate of M.P. 161° C. are obtained. Yield: 40% of the theoretical.

By the same way there may be obtained the following compound:

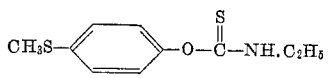

Example 7

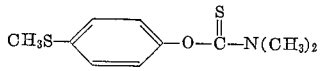

23 g. of powdered sodium are dissolved in a mixture of 500 ml. of benzene and 200 ml. of anhydrous alcohol. 140 g. (1 mol) of p-methylmercapto-phenol dissolved in 300 ml. of benzene are added thereto. The alcohol is then evaporated azeotropically with an excess of benzene. The residue sodium salt of p-methylmercapto-phenol is dissolved in 400 ml. of methyl ethyl ketone. 150 g. of dimethyl-triocarbamic acid chloride (M.P. 43° C.) are then added at 70° C. while stirring. The mixture is then heated to 75° C. for 3 hours and worked up in usual manner. 120 g. of p-methylmercapto-phenyl-dimethyl-thiocarbamate of B.P. 127° C./0.04 mm. Hg, M.P. 93° C., are thus obtained. Yield: 94% of the theoretical. LD$_{50}$ toxicity on rats per os is 1000 mg./kg.

By the same way there may be obtained the following compound:

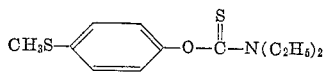

Example 8

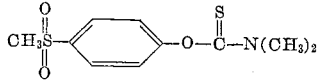

113 g. (0.5 mol) of the sodium salt of p-methylsulfonyl-phenol are suspended in 600 ml. of methyl ethyl ketone. 75 g. of dimethyl-thiocarbamic acid chloride dissolved in 50 ml. of methyl ethyl ketone are added at 35° C. The mixture is then heated to 60–70° C. for one hour. The reaction product is worked up in the usual manner. 91 g. of p-methylsulphonyl-phenyl-dimethyl-thiocarbamate of M.P 187° C. (redissolved from dioxane) are thus obtained. Yield: 70% of the theoretical. LD$_{50}$ toxicity on rats per os is 1000 mg./kg. 80% of the caterpillars are killed with solutions of 0.1%.

Example 9

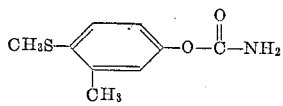

44 g. (0.2 mol) of 4-methylmercapto-3-methyl-phenyl-chloroformic acid ester (B.P. 66° C./0.01 mm. Hg) are dissolved in 100 ml. of acetone. This solution is added while stirring at −10° C. to 40 ml. of 25% aqueous ammonia to which 50 ml. of acetone have been added. When the reaction has subsided, water is added as long as the reaction product crystallizes out. The product is then filtered off with suction and recrystallized from benzene. In this way, 27.6 g. of 4-methyl-mercapto-3-methyl-phenyl-carbamate of M.P. 144° C. are obtained. Yield: 70% of the theoretical. LD$_{50}$ toxicity on rats per os is 1000 mg./kg.

Example 10

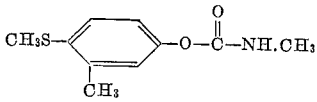

54 g. (0.25 mol) of 4 - methylmercapto - 3 - methyl-phenyl-chloroformic acid ester are dissolved in 100 ml. of acetone. This solution is added with good stirring at +10° C. to 65 g. of a 26% aqueous methylamine solution. The methylamine solution was dissolved in 100 ml. of acetone. When the reaction has subsided, the reaction product is stirred into 300 ml. of ice water. Subsequently the precipitated oil is dissolved in 300 ml. of chloroform. The chloroform solution is shaken several times with water, dried over sodium sulfate and then distilled. In this way, 31 g. of 4 - methylmercapto - 3 - methyl - phenyl-methyl-carbamate of B.P. 111° C./0.01 mm. Hg are obtained. Yield: 59% of the theoretical. Upon prolonged standing, the carbamate solidifies and shows M.P. 81° C. LD$_{50}$ toxicity on rats per os is 37.5 mg./kg. Mosquito larvae are killed completely with solutions of 0.0001%. Caterpillars are 100% killed with 0.02% solutions. Ticks are completely killed with solutions of 0.1%.

Example 11

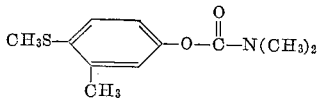

47 g. (0.3 mol) of 4 - methylmercapto - 3 - methyl-phenol (M.P. 61° C.) are dissolved in 100 ml. of benzene. A sodium methylate solution containing 0.3 mol of dissolved sodium is added thereto. The methylalcohol is then evaporated azeotropically with an excess of benzene. The residual sodium salt is dissolved in 200 ml. of methyl ethyl ketone and treated with good stirring at 60° C. with 50 g. of dimethyl-carbamic acid chloride. The mixture is further heated to 70° C. for ½ hour and then worked up in the usual manner. 33.7 g. of 4 - methylmercapto-3 - methyl - phenyl - dimethyl - carbamate of B.P. 121°C./ 0.02 mm. Hg are thus obtained. Upon prolonged standing, the carbamate crystallizes and shows M.P. 70° C. Yield: 50% of the theoretical. LD$_{50}$ toxicity on rats per os is 250 mg./kg. Mosquito larvae are killed completely with solutions of 0.001%. 50% of the ticks are killed with solutions of 0.05%.

Example 12

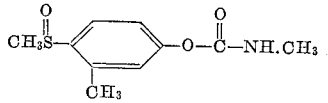

27 g. (0.13 mol) of 4 - methylmercapto - 3 - methyl-phenyl - methyl - carbamate (M.P. 81° C.) are dissolved in 100 ml. of methylalcohol. To the solution are added a few drops of 50% sulphuric acid. 13 ml. of a 35% hydrogen peroxide solution are then added at 40° C. with good stirring. When the reaction has subsided, the product is further stirred at room temperature for 5 hours. The reaction product is then neutralized by the addition of a small amount of calcium carbonate. The salts are filtered off with suction and the solvent and the water formed are removed under vacuum. In this way, 9 g. of 4 - methylsulphinyl - 3 - methyl - phenyl - methyl-carbamate of M.P. 136° C. (from acetone) are obtained. Yield: 30% of the theoretical. LD$_{50}$ toxicity on rats per os is 10 mg./kg. Spider-mites and caterpillars are killed completely with solutions of 0.1%.

Example 13

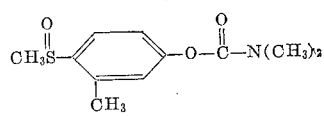

51 g. (0.3 mol) of 4 - methylsulphinyl - 3 - methyl-phenol (M.P. 123° C.) are dissolved in 250 ml. of ethyl acetate. 42 g. of finely powdered potassium carbonate are added thereto and the mixture is then heated to 60° C. while stirring. Subsequently, 50 g. of dimethyl-carbamic acid chloride are added thereto and heating is continued at 70° C. for a further 2 hours. 200 ml. of chloroform are then added and the mixture is cooled to room temperature. The solution is washed several times with water and then dried over sodium sulphate. The solvents are then distilled off under vacuum. The residual pale brown viscous oil solidifies upon prolonged standing. By re-crystallisation from benzene there are obtained 29 g. of 4 - methylsulphinyl - 3 - methyl - phenyl - dimethyl-carbamate of M.P. 76° C. (from ligroin) are obtained. Yield 40% of theoretical. The $LD_{50}$ toxicity on rats per os is 75 mg./kg. Spider-mites are killed completely with solutions of 0.1%. Ticks are 100% killed with 0.6% solutions.

Example 14

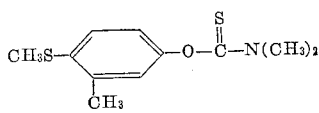

56 g. (0.3 mol) of 4 - methylsulphonyl - 3 - methyl-phenol (M.P. 108° C.) are dissolved in 250 ml. of methyl ethyl ketone. Subsequently, 42 g. of anhydrous powdered potassium carbonate are added thereto. 50 g. of dimethyl-carbamic acid chloride are then added dropwise with vigorous stirring at 60° C. and the mixture is heated to 70° C. for an hour. After working up in usual manner, 54 g. of 4 - methyl - sulphonyl - 3 - methyl - phenyl-dimethyl - carbamate of M.P. 105° C. (from ligroin) are obtained. Yield: 70% of the theoretical. $LD_{50}$ toxicity on rats per os is 500 mg./kg.

Example 15

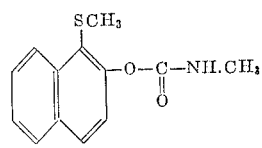

47 g. (0.3 mol) of 4 - methylmercapto - 3 - methyl-phenyl are dissolved in 400 ml. of benzene. A sodium methylate solution containing 0.3 mol of dissolved sodium is added thereto. The alcohol is then removed by azeotropic distillation with an excess of benzene. The resulting sodium salt is dissolved in 150 ml. of methyl ethyl ketone. 45 g. of dimethyl-thiocarbamic acid chloride dissolved in 100 ml. of methyl ethyl ketone are subsequently added at 45° C. The mixture is heated to 70° C. for one hour and then worked up in usual manner. 58 g. of 4 - methyl - mercapto - 3 - methyl - phenyl - dimethyl-thicarbamate of B.P. 120° C./0.01 mm. Hg are thus obtained. Yield: 80% of the theoretical. Upon prolonged standing the carbamate solidifies and shows melting point 63° C. $LD_{50}$ toxicity on rats per os is 100 mg./kg.

Example 16

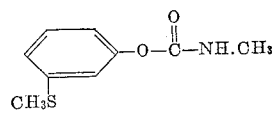

102 g. (0.5 mol) of 3-methylmercapto-phenyl-chloroformic acid ester (B.P. 53° C./0.01 mm. Hg) are dissolved in 600 ml. of benzene. At 0° C. 31 g. of anhydrous methylamine are added to this solution. When the reaction has subsided, the product is stirred at room temperature for a further 2 hours and then worked up in usual manner. 75 g. of 3 - methyl - mercapto - phenyl-methyl-carbamate are thus obtained as an orange-yellow water-insoluble oil. Yield: 76% of the theoretical.

Example 17

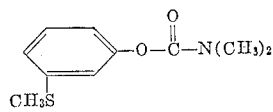

70 g. (0.5 mol) of 3 - methylmercapto-phenol (B.P. 110° C./2 mm. Hg) are dissolved in 400 ml. of benzene. A sodium methylate solution containing 0.5 mol of dissolved sodium is then added thereto. The methyl alcohol is subsequently distilled off azeotropically with an excess of benzene. The resulting sodium salt is dissolved in 300 ml. of methyl ethyl ketone and treated at 50° C. with good stirring with 60 g. of dimethyl-carbamic acid chloride. The mixture is further heated at 60° C. for one hour and then worked up in usual manner. 85 g. of 3-methylmercapto - phenyl - dimethyl - carbamate of B.P. 83–84° C./0.01 mm. Hg are thus obtained. Yield: 81% of the theoretical.

Example 18

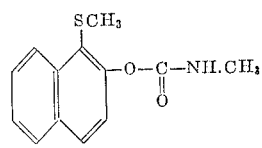

80 g. (0.3 mol) of 1 - methylmercapto - 2 - naphthyl-chloroformic acid ester are dissolved in 50 ml. of acetone. This solution is added with good stirring at −10° C. to a solution of 80 g. of a 26% aqueous methylamine solution in 120 ml. of acetone. When the reaction has subsided, 100 ml. of water are stirred in at −10° C. The completely precipitated reaction product is then taken up with chloroform. The chloroform layer is separated and washed wtih water. It is then dried over sodium sulphate. Upon distilling off the chloroform under vacuum, the new carbamate remains as a rapidly solidifying oil. It crystallizes as white needles showing M.P. 151° C. Yield: 37 g., corresponding to 50% of the theoretical. $LD_{50}$ toxicity on rats per os is 750 mg./kg. Aphids are completely killed with solutions of 0.1%.

Example 19

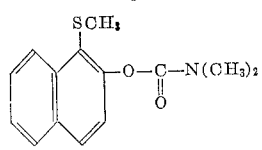

57 g. (0.3 mol) of 1-methylmercapto-2-napthol (B.P. 70°C./0.01 mm. Hg) are dissolved in 400 ml. of benzene. A sodium methylate solution containing 0.3 mol of dissolved sodium is added thereto. The methyl alcohol is subsequently distilled off azeotropically with an excess of benzene. The resulting sodium salt is dissolved in 250 ml. of methyl ethyl ketone. To this solution 35 g. of demethyl-carbamac acid chloride are added with good stirring. The mixture is subsequently heated to 70–75° C. for one hour and then worked up in usual manner. 51 g. of 1 - methylmercapto - 2 - napthyl-dimethyl-carbamate of M.P. 89°C. are thus obtained. Yield: 71% of the theoretical. $LD_{50}$ toxicity on rats per os is 1000 mg./kg. Aphids are completely killed with solutions of 0.1%.

Example 20

26 g. (0.15 mol) of ethylmercapto-methyl-phenol (B.P. 92° C./0.05 mm. Hg) are dissolved in 300 ml. of benzene. A sodium methylate solution containing 0.15 mol of dissolved sodium is added thereto. After distilling off the methyl alcohol azeotropically, the resulting sodium salt is taken up with 100 ml. of methyl ethyl ketone. At 70° C., 20 g. of dimethyl-carbamic acid chloride are then added dropwise with good stirring. The mixture is heated to 70° C. for one hour and then worked up in usual manner. 36 g. of p-ethylmercapto-methyl-phenyl-dimethyl-carbamate of B.P. 98° C./0.01 mm. Hg are thus obtained. Yield: 96% of the theoretical. $LD_{50}$ toxicity on rats per os is 1000 mg./kg. Spider-mites are completely killed with solutions of 0.1%.

*Example 21*

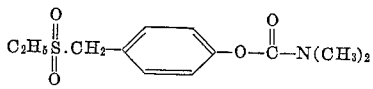

19 g. (0.09 mol) of 4-ethylsulphonyl-methyl-phenol (M.P. 90° C.) are dissolved in 60 ml. of methyl ethyl ketone. 14 g. of dimethylcarbamic acid chloride are subsequently added at 70° C. with good stirring. The mixture is further heated at 70° C. for a short time and then worked up in usual manner. 13 g. of p-ethylsulphonyl-methyl-phenyl-dimethyl-carbamate of M.P. 121° C. are thus obtained. Yield: 50% of the theoretical. $LD_{50}$ toxicity on rats per os is 500 mg./kg. Larvae of flies are completely killed with solutions of 0.1%.

*Example 22*

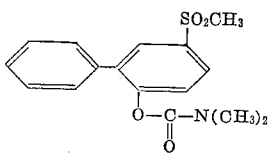

37.5 g. (0.15 mol) of 2-hydroxy-5-methyl-sulphonyl-diphenyl (M.P. 194° C.) are dissolved in 150 ml. of methyl ethyl ketone. To this solution are added 22 g. of finely powdered potassium carbonate. 20 g. of dimethyl-carbamic acid chloride are then added dropwise at 70° C. The mixture is heated to 75° C. for one hour and then worked up in usual manner. 10 g. of the new carbamate of M.P. 154° C. are thus obtained. Yield: 23% of the theoretical. $LD_{50}$ toxicity on rats per os is 1000 mg./kg. Aphids are completely killed with solutions of 0.1%.

*Example 23.—2-methylmercapto-4-methylphenyl-N-methylcarbamate*

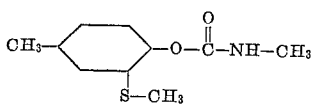

30.8 g. (0.2 mol) of 2-methylmercapto-4-methyl-phenol are treated with 13.1 g. (0.23 mol) of methylisocyanate. On the addition of 3 drops of triethylamine the mixture begins to react with the evolution of heat. After completion of the reaction, the carbamate separates out in crystalline form. For purification, it is re-crystallised from ligroin. Yield: 40 g.; M.P. 102° C.

| Conc. | Phaedon-cochleariae | Cater-pillars | Droso-phila | Aphids | Spider mites |
|---|---|---|---|---|---|
| 0.2 | 100% | 100% | 0 | 100% | 0 |
| 0.02 | 80% | 100% | 0 | 100% | 0 |

*Example 24.—2-ethylmercapto-4-methylphenyl-N-methylcarbamate*

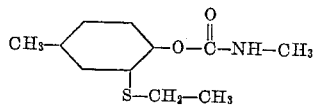

The reaction is carried out as described in Example 1. From 16.8 g. (0.1 mol) of 2-ethylmercapto-cresol and 6.3 g. (0.11 mol) of methyl-isocyanate are obtained 18.8 g. of carbamate having M.P. 77–80° C. (re-crystallised from ligroin).

| Conc. | Cater-pillars | Droso-phila | Aphids | Spider mites | Systemic (Aphids) |
|---|---|---|---|---|---|
| 0.2 | 100% | 0 | 100% | 0 | 100% |
| 0.02 | 100% | ------- | 100% | ------- | 0 |
| 0.002 | 50% | ------- | 0 | ------- | 0 |

*Example 25.—2-allylmercaptophenyl-N-methylcarbamate*

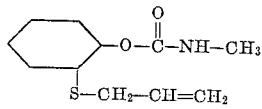

The reaction is carried out as described in Example 1. From 16.6 g. (0.1 mol) of o-allylmercapto-phenol and 6.3 g. (0.11 mol) of methyl-isocyanate are obtained 13 g. of o-allylmercapto-phenyl-N-methylcarbamate. After re-crystallisation from ligroin it melts at 66° C.

| Conc. | Cater-pillars | Droso-phila | Aphids | Spider mites | Systemic (Aphids) |
|---|---|---|---|---|---|
| 0.2 | 100% | 90% | 100% | 90% | 90% |
| 0.02 | 100% | ------- | 95% | ------ | -------- |
| 0.002 | 40% | ------- | ------- | ------- | -------- |

In a similar manner the following compounds are obtained:

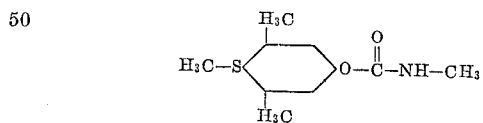

M.P. 121.5°.

DESTROYED PERCENT

| Conc. | Droso-phila | T. telarius | Meal moth | Bean beetle | Wax moth | Trombi-diidae | Conc. | Gall mite |
|---|---|---|---|---|---|---|---|---|
| 0.1 | 100 | 100 | 100 | 100 | 100 | 100 | 0.1 | 100 |
| 0.02 | 100 | 100 | 100 | 100 | 100 | 70 | 0.01 | 100 |
| 0.004 | 90 | 100 | 90 | 90 | -------- | 40 | 0.001 | 100 |

Permanent action after spraying: control animal; Piesma quadrata.
Conc. 0.05: 1 day, 100%; 4 days, 100%; 7 days, 100%; 11 days, 100%; 13 days, 70%; 15 days, 10%.

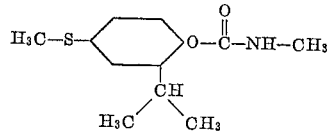

M.P. 98.5°.

DESTROYED PERCENT

| Conc. | Cater-pillars | Aphids | Grain Weevils | Fly larvae | Mosquito larvae |
|---|---|---|---|---|---|
| 0.2 | 100 | 100 | | | |
| 0.1 | | | 100 | 100 | 100 |
| 0.02 | 0 | 100 | | | |
| 0.01 | | | 0 | 0 | |
| 0.002 | | 100 | | | 100 |
| 0.001 | | | | | 100 |

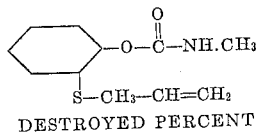

DESTROYED PERCENT

| Conc. | Cater-pillars | Droso-phila | Aphids | Spider mites | Systemic (Aphids) |
|---|---|---|---|---|---|
| 0.2 | 100 | 90 | 100 | 90 | 90 |
| 0.02 | 100 | | 95 | | |
| 0.002 | 40 | | | | |

*Example 26*

75.5 parts of phenyl-N-methylcarbamate and 88.2 parts of 4-methylmercapto-3,5-dimethyl-phenol are heated in 200 parts of 1,2,4-trichlorobenzene with the addition of 2 parts of sodium acetate to 92–95° C. at 8.5 mm. Hg for 2 hours whereby initially only pure phenol distills off. Subsequently, the whole trichlorobenzene together with the phenol set free is distilled off at 100–110° C. with the simultaneous dropwise addition of a further 200 g. of 1,2,4-trichlorobenzene, finally pressure of 1 mm. Hg. The residue is stirred into 500 parts of 2 N sodium hydroxide solution. The precipitated crystals are filtered off with suction and washed with water, until the filtrate runs off neutral. After drying, 65 parts of 4-methylmercapto-3,5-dimethyl-phenyl-N-methylcarbamate of melting point 121° C. are obtained. After acidification with sulphuric acid, extraction with benzene and distilling off of the benzene, 32 parts of 4-methylmercapto-3,5-dimethyl-phenol are recovered from the filtrate.

*Example 27.—o-Propargyl-mercapto-phenyl-N-methyl-carbamate*

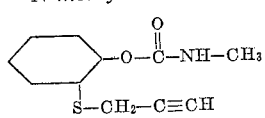

41 g. (0.25 mol) of o-propargyl-mercapto-phenol are suspended in a small amount of benzene and reacted with 15.7 g. (0.27 mol) of methyl-isocyanate. After the addition of 1 drop of tri-ethyl-amine the mixture starts reacting. Then the solvent is removed under vacuum and the carbamate is recrystallized from ligroin. M.P. 90° C.

| Conc. | Caterpillars | M. persicae | T. telarius | Systemic M. persicae |
|---|---|---|---|---|
| 0.2 | 100% | 100% | 90% | 90% |
| 0.02 | 100% | 0% | | |

*Example 28.—o-(c-Chloro-allylmercapto)-phenyl-N-methylcarbamate*

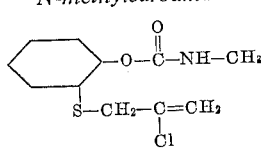

20 g. (0.1 mol) of o-(2-chloro-allyl-mercapto)phenol are suspended in benzene and reacted with 6.3 g. (0.11 mol) of methyl-isocyanate and 3 drops of tri-ethyl-amine.

After completion of the reaction, the carbamate is recrystallized from ligroin. M.P. 43°.

| Conc. | Caterpillars | D. fabae | T. telarius green resist. | Systemic D. fabae |
|---|---|---|---|---|
| 0.2 | 100% | 100% | 100% | 100% |
| 0.02 | 30% | 100% | | |

We claim:
1. A method for combating insects which comprises contacting said insects with an effective amount of a compound of the following formula

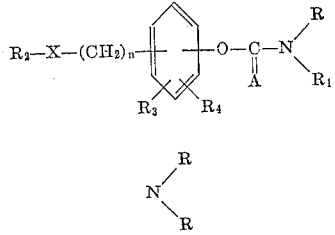

wherein

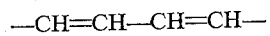

stands for a member selected from the group consisting of $NH_2$, NH alkyl, $N(alkyl)_2$—said alkyl each having 1 to 4 carbon atoms—and a 5 to 6 membered heterocyclic radical in which the ring members are selected from the group consisting of carbon, nitrogen, oxygen and sulfur; A is a member selected from the group consisting of oxygen and sulfur; $R_2$ is a member selected from the group consisting of alkyl having 1 to 4 carbon atoms, alkenyl having 1 to 4 carbon atoms, 2-chloro-allyl and propargyl; X is a member selected from the group consisting of S, SO and $SO_2$; $R_3$ and $R_4$ are each members selected from the group consisting of hydrogen, lower alkyl, phenyl and, when taken together,

—CH=CH—CH=CH— to complete a naphthyl radical and $n$ is a whole number from 0 to 1.

2. A method for combating insects which comprises contacting said insects with an effective amount of a compound of the following formula

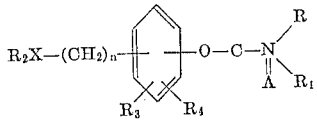

wherein

stands for a member selected from the group consisting of $NH_2$, NH alkyl, $N(alkyl)_2$—said alkyl each having 1 to 4 carbon atoms—and a 5 to 6 membered heterocyclic radical in which the ring members are selected from the group consisting of carbon, nitrogen, oxygen and sulfur; A is a member selected from the group consisting of oxygen and sulfur; $R_2$ is a member selected from the group consisting of alkyl having 1 to 4 carbon atoms, alkenyl having 1 to 4 carbon atoms, 2-chloro-allyl and propargyl; X is a member selected from the group consisting of S, SO and $SO_2$; $R_3$ is a member selected from the group consisting of hydrogen, lower alkyl and phenyl, $R_4$ is a member selected from the group consisting of hydrogen and lower alkyl and $n$ is a whole number from 0 to 1.

3. A method for combating insects which comprises contacting said insects with an effective amount of a compound of the following formula

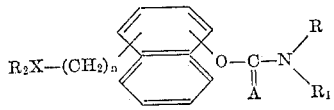

wherein

stands for a member selected from the group consisting of NH$_2$, NH alkyl, N alkyl, N(alkyl)$_2$—said alkyl each having 1 to 4 carbon atoms—and a 5 to 6 membered heterocyclic radical in which the ring members are selected from the group consisting of carbon, nitrogen, oxygen and sulfur; A is a member selected from the group consisting of oxygen and sulfur; R$_2$ is a member selected from the group consisting of alkyl having 1 to 4 carbon atoms, alkenyl having 1 to 4 carbon atoms, 2-chloro-allyl and propargyl and X is a member selected from the group consisting of S, SO and SO$_2$.

4. A method for combating insects which comprises contacting said insects with an effective amount of a compound of the following formula

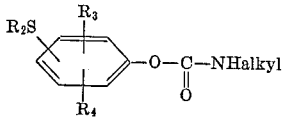

wherein alkyl has from 1 to 4 carbon atoms; R$_3$ and R$_4$ are each lower alkyl and R$_2$ is alkyl having from 1 to 4 carbon atoms.

5. A method for combating insects which comprises contacting said insects with an effective amount of a compound of the following formula

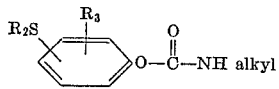

wherein alkyl has from 1 to 4 carbon atoms; R$_3$ is lower alkyl and R$_2$ is alkyl having from 1 to 4 carbon atoms.

6. A method for combating insects which comprises contacting said insects with an effective amount of a compound of the following formula

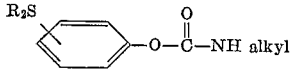

wherein alkyl and R$_2$ are each alkyl having from 1 to 4 carbon atoms.

7. A method for combating insects which comprises contacting said insects with an effective amount of a compound of the following formula

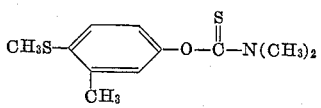

8. A method for combating insects which comprises contacting said insects with an effective amount of a compound of the following formula

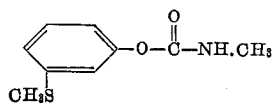

9. A method for combating insects which comprises contacting said insects with an effective amount of a compound of the following formula

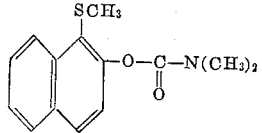

10. A method for combating insects which comprises contacting said insects with an effective amount of a compound of the following formula

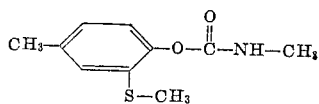

11. A method for combating insects which comprises contacting said insects with an effective amount of a compound of the following formula

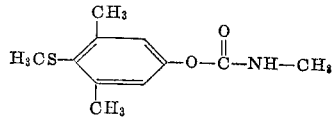

12. The compound of the following formula:

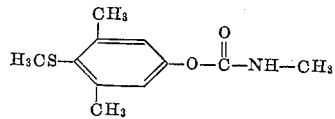

References Cited by the Examiner

UNITED STATES PATENTS

| | | | |
|---|---|---|---|
| 2,776,197 | 1/1957 | Gysin et al. | 71—2.4 |
| 3,206,502 | 9/1965 | Heiss et al. | 260—479 |

FOREIGN PATENTS

| | | |
|---|---|---|
| 554,576 | 3/1958 | Canada. |
| 1,275,658 | 10/1961 | France. |
| 1,142,599 | 1/1963 | Germany. |
| 1,147,572 | 4/1963 | Germany. |
| 1,148,107 | 5/1963 | Germany. |
| 1,162,352 | 2/1964 | Germany. |
| 912,895 | 12/1962 | Great Britain. |

OTHER REFERENCES

Kolbezen et al., Journal of Agricultural and Food Chemistry, 2: 864–870 (1954).

German application G15250Na/451, filed October 1956.

ELBERT L. ROBERTS, *Primary Examiner.*

LEWIS GOTTS, *Examiner.*

S. K. ROSE, *Assistant Examiner.*